US006317611B1

(12) United States Patent
Kobayakawa

(10) Patent No.: US 6,317,611 B1
(45) Date of Patent: Nov. 13, 2001

(54) COMMUNICATION DEVICE WITH ADAPTIVE ANTENNA

(75) Inventor: Shuji Kobayakawa, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/666,461

(22) Filed: Sep. 20, 2000

(30) Foreign Application Priority Data

Sep. 24, 1999 (JP) ........................................ 11-270008

(51) Int. Cl.[7] ........................................ H04B 1/38

(52) U.S. Cl. ........................ 455/561; 455/25; 455/63; 342/354; 342/147

(58) Field of Search ........................ 455/561, 562, 455/91, 102–103, 132, 63, 59, 61, 504, 11.1, 25; 375/140, 146, 147; 342/147, 154, 350, 354

(56) References Cited

U.S. PATENT DOCUMENTS 5,548,834 * 8/1996 Suard et al. ........................ 455/63
6,084,928 * 7/2000 Kuwahara ........................ 342/147
6,101,399 * 8/2000 Raleigh et al. ........................ 455/561

FOREIGN PATENT DOCUMENTS 6-164434 6/1994 (JP) .
9-219615 8/1997 (JP) .
10-229307 8/1998 (JP) .

* cited by examiner

*Primary Examiner*—Doris H. To
(74) *Attorney, Agent, or Firm*—Rosenman & Colin, LLP

(57) ABSTRACT

A communications device using an adaptive antenna allows for adaptive control of the weights provided as an input to each antenna elements of the downlink based on uplink arrival angle information regardless of the difference between the uplink and downlink frequencies, and thereby increase the system capacity of the communications system. The communication device includes an downlink weighting calculator which extracts arrival angle information for each user from uplink user signal information, simulated user signals corresponding to each antenna branch which are generated in a simulated user signals generator and a downlink weighting calculator which controls based on the arrival angle of a desired user, and the weights of the downlink applied to the respective antenna branches, based on an arbitrary adaptive algorithm using these simulated user signals.

9 Claims, 12 Drawing Sheets

COMMUNICATION DEVICE WITH ADAPTIVE ANTENNA

BACKGROUND OF THE INVENTION

Field of the Invention

The present invention relates to a communication device using an adaptive antenna which is suited to be the wireless base station of a mobile communications system or the like.

The next-generation mobile communications system named IMT-2000 is required to deliver not only voice communications services, had also video and other relatively large-volume data communications services. Because of these demands, as more advanced technology for increasing the system capacity of the wireless base stations, adaptive antennas (adaptive array antennas), which can improve the SIR (signal-to-interference ratio) of each user signal and increase the system capacity, have become strong candidates.

These adaptive antennas consist of a plurality of antenna elements provided at the base station of the mobile communications system, and arbitrary weights, (amplitude, phase) are applied to the signals input to the respective elements to perform beam formation in the desired direction. However, it is necessary to be able to control the weights applied to the antenna branches so that portions of the beam with a high gain are directed to the desired user (the user to be communicated with) and portions of the beam with low gain are directed to interfering users (users not to be communicated with).

Description of the Prior Art

FIG. 12 shows a conventional example of a configuration of a communicative device with an array antenna. In the figure, 1 is an array antenna consisting of a plurality of antenna branches (antenna elements). 2 is a duplexer, which is used to obtain isolation of a transmit/receive, path in the case that one antenna branch is used for both transmitting, and receiving, 3 are weighting multipliers 3, and when an adaptive array antenna (AAA) is used in the uplink, these weighting multipliers 3 multiply the weights by the uplink signals of each antenna branch. 4 is an adder that adds the outputs of these weighting multipliers 3.

5 is the adaptive processor (AAA weighting block) for the uplink, and this adaptive processor 5 calculates the weights of each antenna branch based on the uplink signals of each antenna branch, the combined signal from the adder 4 and an arbitrary reference signal set. The weights of each antenna branch calculated by the adaptive processor 5 are provided as input to weighting multipliers 9 corresponding to each antenna branch.

11 is a data generator, in which data generation is performed according to the coding and frame format required, and the data thus generated is branched through a signal splitter 10 and provided as input to the respective weighting multipliers 9, where it is multiplied by the weights from the adaptive processor 5. The output corresponding to each antenna branch (user signals) is multiplexed with the user signals in the same cell or the same sector for each branch by the user signal multiplexers 12, passes through the duplexer 2 and is provided as output from the array antenna 1.

In the system as described above, on the downlink, particularly in the case of FDD (Frequency Division Duplex) wherein the frequencies are different on the uplink and downlink, as shown in "The Effect of Interference Suppression in Forward Link by Adaptive Array Antenna Transmitting for W-CDMA Mobile Radio" (RCS 98-72), adaptive control is performed on the uplink but transmission is performed on the downlink using exactly the same adaptive weightings as those generated for the unlink, but the beam shape of an array antenna has properties that vary depending on the frequency, so the afore-described, method has a limitation in that it can be used only under conditions wherein the difference between the transmit frequency and the receive frequency is no more than roughly 10%.

In this case, since the weights of the uplink are used for the downlink in the prior art system, when the difference between the receive frequency and the transmit frequency is large in the case of FDD, the high-gain portion of the beam may not necessarily be directed in the desired user direction, and similarly there is no guarantee that the low-level beam is directed in the interfering user directions. This tendency worsens particularly in the case in which the frequency difference exceeds 10%, leading to deterioration of characteristics.

In addition, in the case of simultaneous communications by a number of users in excess of the degrees of freedom (N-1) of the antenna (number of antenna elements: N) such as in CDMA, the efficient improvement to characteristics is not feasible.

SUMMARY OF THE INVENTION

It is an object of the present invention to avoid the above disadvantages. It is another object of this invention to permit adaptive control of the weights provided as input to each antenna element of the downlink based on uplink arrival angle information regardless of the difference between the uplink and downlink frequencies, and thereby increase the system capacity of the communications system.

The above and other objects of the present invention are attained by a communications device using an adaptive antenna, comprising an array antenna consisting of a plurality of antenna elements wherein beam shaping is performed by adaptively giving arbitrary weights to signals input to the respective antenna elements.

In the communications device using an adaptive antenna of the present invention, in the arrival angle information for each user is extracted from uplink user signal information, simulated user signals corresponding to each antenna branch are generated based on the arrival angle of a desired user, and the weights of the downlink applied to the respective antenna branches are controlled based on an arbitrary adaptive algorithm using these simulated user signals.

Generating simulated user signals and controlling the weights as described above is performed by: setting the arrival angle of a desired user and simulated first and second arrival angles that bracket the arrival angle of said desired user, setting N-3 or more simulated arrival directions (third, fourth, . . . ) (N: number of antenna elements, N>3) in addition to these arrival angles, and generating simulated user signals corresponding to each antenna branch using this arrival direction information, phase information determined from the antenna arrangement, etc., and uncorrelated or poorly-correlated signals, respectively, and using these simulated user signals in an arbitrary adaptive algorithm to control the weights and applied to the respective antenna branches.

In addition, the simulated first and second arrival directions that bracket the arrival angle of the desired user are set to the direction that is closest to the main beam among the null directions at the time of pointing the beam such that the gain in the desired user direction is maximum.

In addition, representative values from each angle range selected based on the arrival angles of each user and the first and second arrival angles aggregated in each cell or each sector are used to set third, fourth, . . . simulated arrival angles.

Furthermore, in changing the weights sequentially applied to each antenna branch, a function is provided for calculating the level of the desired-direction user and the level in each interfering user direction at arbitrary time intervals from information on the beam pattern formed from various user functional blocks and information on the desired-user direction and the interfering user directions, and comparing [these levels] against the previous levels, so that if the characteristics would be improved by changing to new weights then the change to the new weights is made, but if the converse is true and the characteristics were better in the previous state then those weights are kept, and the adaptive algorithm calculations the next weights based on the new weights regardless of this selection.

Thereby, the adaptive algorithm will not necessarily update optimal values in the process of convergence, but rather the error function will fluctuate while bracketed around the optimal value, so this can be handled.

Mutually orthogonal codes can be used for the uncorrelated or poorly-correlated signals used in the generation of simulated user signals.

In the case in which a multi-path forms, one arrival direction used at the time of formation of the downlink beam is determined from the valid multi-path arrival angle information of the uplink, and control is exerted such that the beam is directed only in that direction.

In addition, at the time of calculating the weights of the downlink, the weights applicable to the antenna branches are subjected to normalization control, and by maintaining the transmitter power per user at an arbitrary value, the total transmitter power of the communications device can be maintained at an arbitrary value.

DETAILED DESCRIPTION OF THE PREFERRED EMBODIMENTS

Here follows an explanation of the embodiments of the present invention made with reference to drawings.

Figure 1:
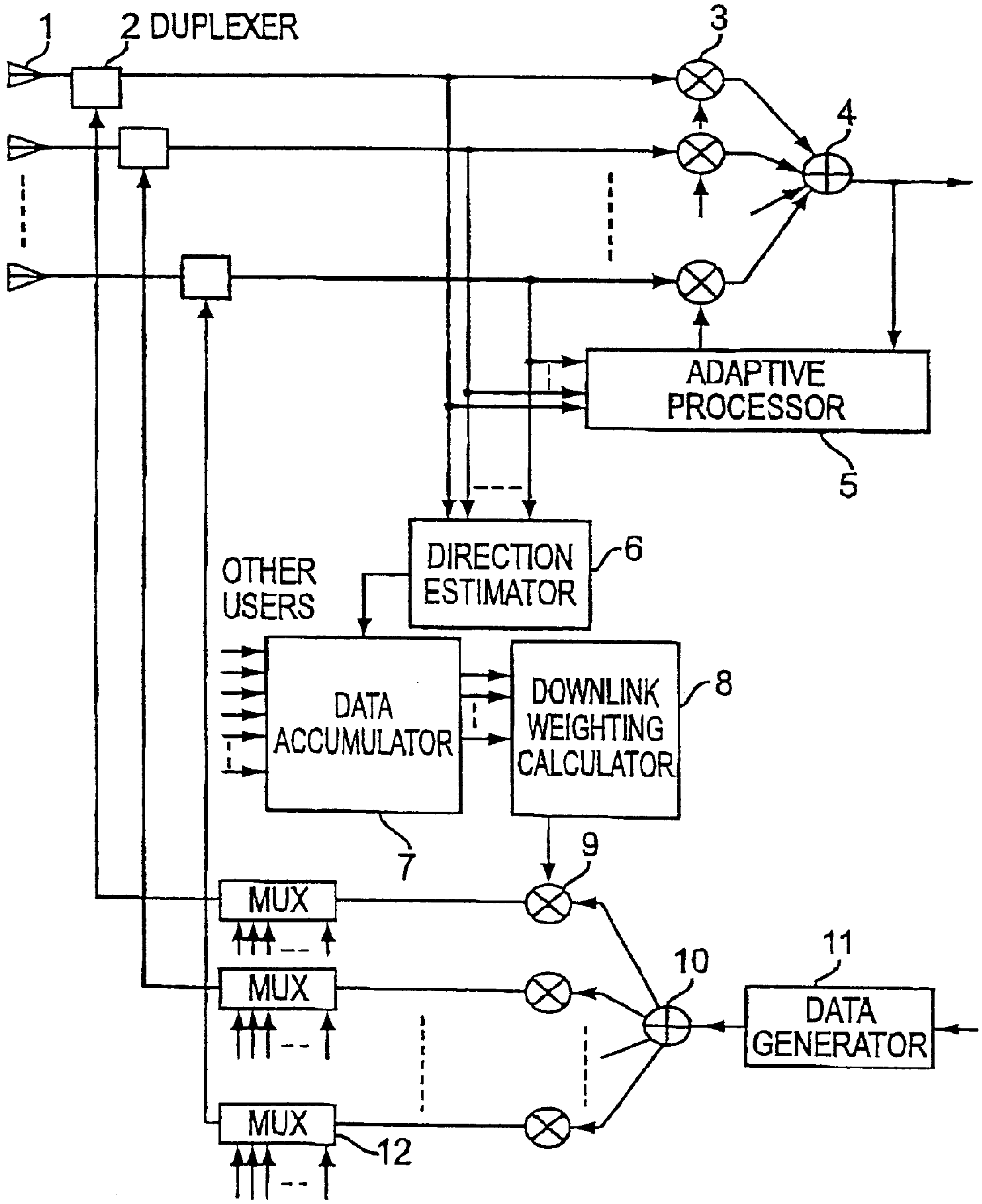
FIG. 1 is a block diagram of a communications device using an adaptive antenna of an embodiment of the present invention.

FIG. 1 shows a circuit configuration of a communication device using an adaptive antenna of a first embodiment of the present invention. This embodiment is an example of applying the adaptive antenna of the present invention to the wireless base station of a CDMA (Code Division Multiple Access) mobile communications system.

In FIG. 1, an array antenna is shown, which consists of a plurality of antenna branches (antenna elements). The communication device further includes duplexer used to obtain isolation of a transmit/receive path in the case that one antenna branch is used for both transmitting and receiving, and weighting multipliers 3. Duplexers 2 are provided respectively for each antenna. When an adaptive array antenna (AAA) is used in the uplink, the weighting multipliers 3 multiply the weights by the unlink signals of each antenna branch. The device further includes an adder that adds the outputs of weighting multipliers 3 and an adaptive processor (AAA weighting block) 5 which calculates the weights of each antenna branch of the uplink.

It is to be noted that in the present invention, since the scheme for the uplink adaptive array antenna is not limited, the afore-described configuration is no more than an illustration of a single example, as many other variations are possible.

The device of the present invention further includes an arrival direction estimator 6 which estimates the arrival direction (arrival angle) from the various user signals of various antenna branches, a user direction data accumulator 7, a downlink weighting calculator 8, weighting multipliers 9, a single splitter 10 and a data generator 11 and a user signal multiplexer 12. The arrival direction estimator 6 is provided for each user, calculating one arrival direction as the representative value among the arrival directions of uplink multi-path signals for the purpose of downlink beam forming. The method of estimating the arrival angle used by this arrival direction estimator 6 may be a known scheme presented in the literature "'98 IEICE (Institute of Electronics, Information and Communication Engineers) Transactions B-5-172" or "'97 IEICE Trans B-5-94" or the like, but the uplink arrival angle estimation scheme in the present invention is not limited in particular, as any scheme may be used.

In passing, in the case of the downlink of a FDD system, the correlation in the channel complex envelope fluctuation between the uplink and downlink is poor, but the multi-path arrival angle directions are the same, and regarding power also, while the magnitude may be different from instant to instant, it becomes same after normalization and average over a relatively long term. Therefore, among these, regarding the information for the arrival angle of each path extracted from the uplink signal, reliability is high even in the case of returning the downlink signal instantaneously after the uplink signal, and this becomes valid information in determining the weights of the downlink antenna elements.

The user direction data accumulator 7 aggregates in each cell or each sector the estimated values of the arrival directions (estimated values of the arrival angles) of each user found by the arrival direction estimator 6, and counts the number of users (user incidence) within an arbitrarily set angle range. In this manner, the distribution of users in each angle range is found and converted into a table in memory (see FIG. 6), and the data in this table is updated as needed at arbitrary time intervals. Then, the user arrival angle and two simulated angles are uniquely determined from this arrival angle, and then these three angles and the angle range information generated in the user direction data accumulator 7 are used to extract the angle adaptively pointed to null as input to the downlink weighting calculator 8. Here follows a detailed description of this operation.

In the downlink weighting calculator 8, angle information from the user direction data accumulator 7 and uncorrelated or poorly-correlated signals (e.g., orthogonal codes) generated internally are used to generate a simulated user signal in consideration of the frequency of the downlink and based on this simulated user signal, adaptive processing including null forming is performed to calculate the weights of the downlink, and these weights are provided as input to the weighting multipliers 9 corresponding to the antenna branches.

In the data generator 11, data generation is performed according to the coding and frame formed required, and the data thus generated is branched through a signal splitter 10 and provided as input to the respective weighting multipliers 9, where it is multiplied by the weights from the downlink weighting calculator 8. The output corresponding to each antenna branch is multiplexed with the user signals in the same cell or the same sector for each branch by the user signal multiplexers 12, passes through the duplexer 2 and is provided as output from the array antenna 1.

Note that the aforementioned explanation omitted the portion from the RF signals to the IF signals, baseband signals along with the up conversion circuits showing all processing being performed in the digital realm. In addition, FIG. 1 shows only the functional blocks for one user (hereinafter referred to as the "user functional blocks) excluding the function blocks of 1, 2, 7 and 12.

Figure 2:
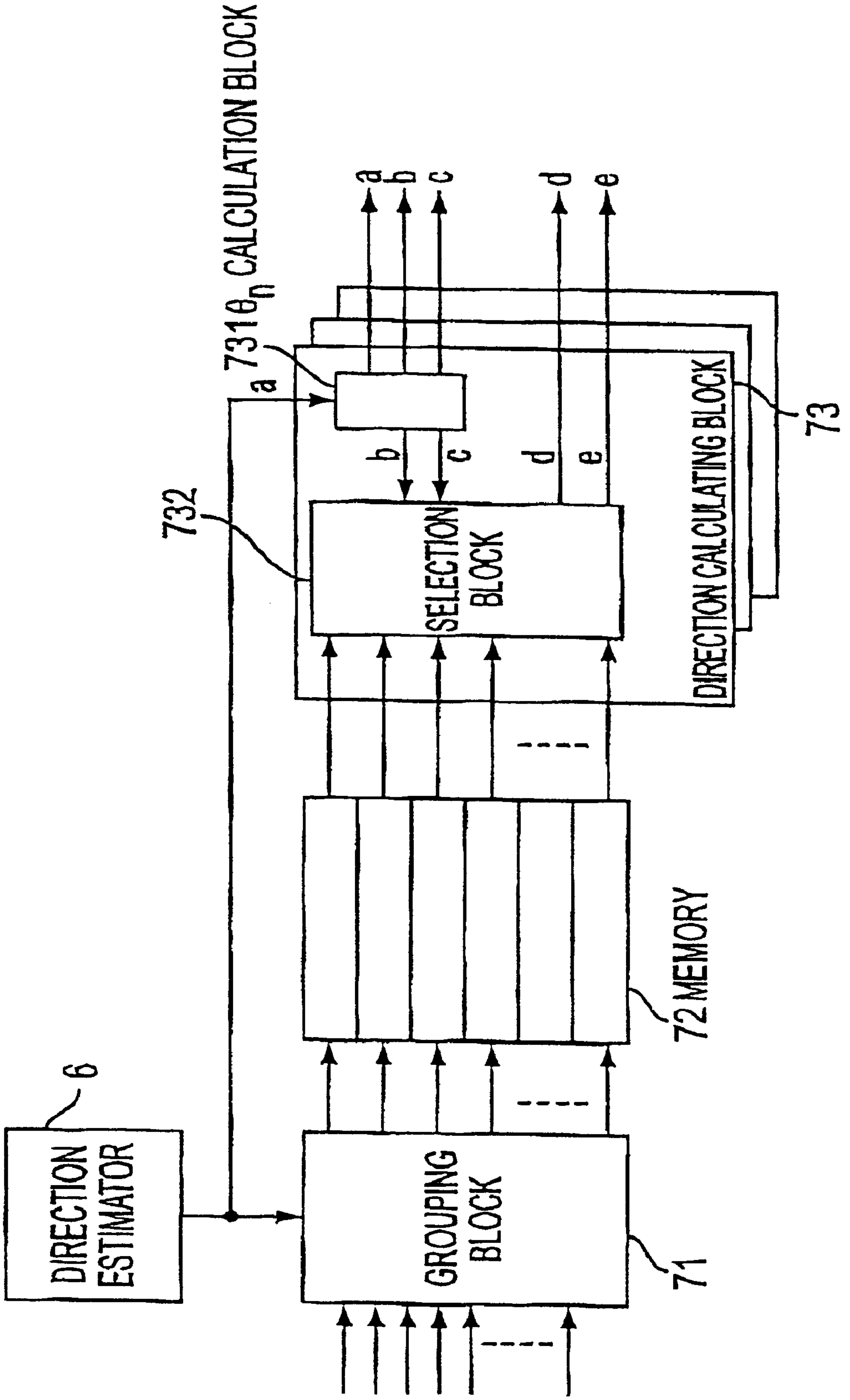
FIG. 2 shows a detailed structure of the user direction data accumulator of the embodiment of the present invention.

FIG. 2 shows in detail the structure of the user direction data accumulator 7. As shown in FIG. 2, the user direction data accumulator 7 collects arrival angle information from the various user functional blocks within the same cell or the same sector, counts the number of users within an arbitrary angle range, converts this to a table and updates this at arbitrary time intervals. The arrival angle grouping unit or block 71 groups the arrival angles of each user under representative arrival angles and provides this as output to a memory 72. The memory 72 aggregates this within various angle ranges and holds this in memory. Then, in a simulated user arrival direction calculation block 73, the uniquely determined first and second simulated user arrival directions $\theta_n$ are calculated by the $\theta_n$ calculation block 731 according to the following equation (1) by using the arrival angle of each user (output from the arrival direction estimator 6).

$$\theta_n=\sin^{-1}[(\lambda_d/2\,\pi d)\{(2n/N)\pi+\phi_0\}] \tag{1}$$

d: distance between elements

N: number of elements $\phi_0$: phase difference between adjacent elements (dependent on the direction of the main beam)

$\lambda_d$: wavelength of the downlink frequency n: ±1

In this manner, in each user functional block, the simulated first and second arrival directions bracketing the arrival angle of the desired user are set to the directions closer to the main beam among the null directions when the beam is directed such that the gain is greatest in the desired user direction.

Next, from the sector configuration (range of the sector in which the antenna array is oriented), antenna configuration (number of antennas, distance between antennas, etc.) and the like, among the angle ranges that do not include the first and second simulated user arrival directions including these desired user directions, in order starting from the largest number of users (the angle range incidence takes into consideration a coefficient that becomes larger the lower the user's information rate), the third, fourth, . . . simulated user arrival directions are selected by a selection unit or block 732. To wit, the arrival angle of the desired user and simulated first and second arrival angles that bracket the arrival angle of said desired user are set, and moreover, N-3 or more simulated arrival directions (N: number of antenna elements, N>3) in addition to these arrival angles are set.

In this manner, representative values from each angle range selected based on the arrival angles of each user and the first and second arrival angles aggregated in each cell or each sector are used to set the third, fourth, . . . simulated arrival angles.

Figure 6:
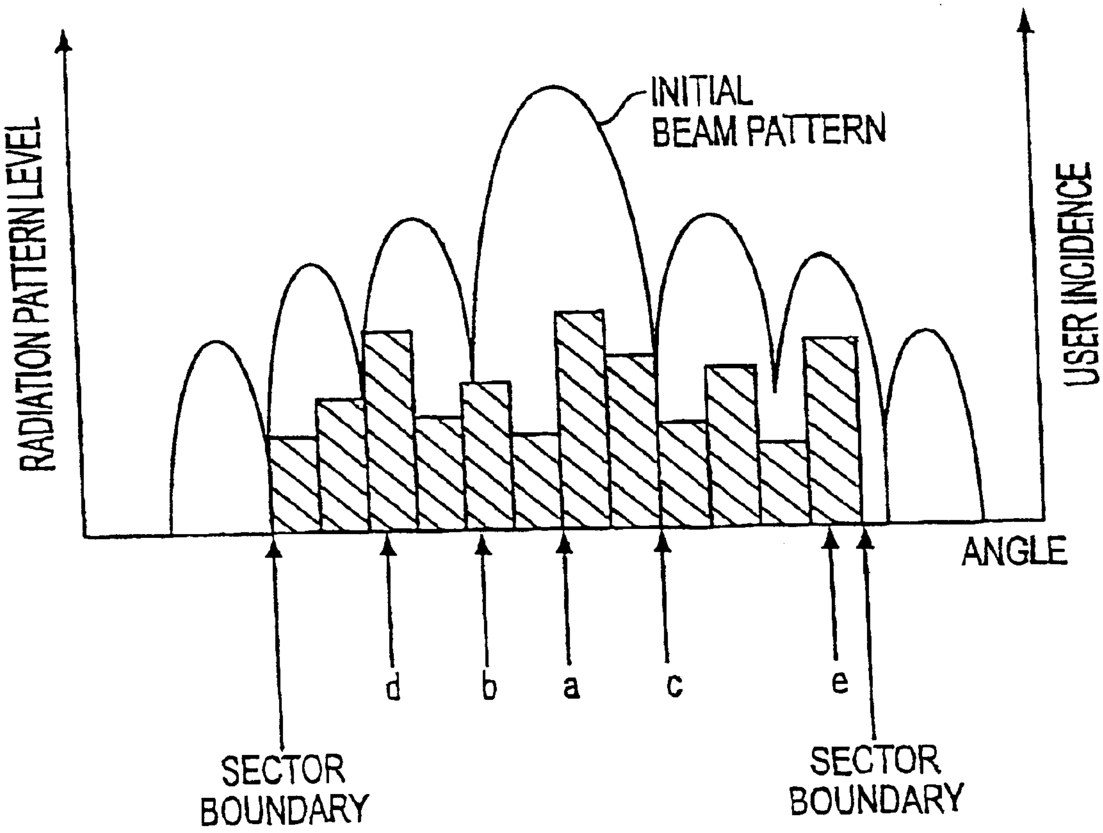
FIG. 6 is a graph for explaining the operation of the user direction data accumulator of the embodiment of the present invention.

FIG. 6 explains afore-described operation of the selection block 732, showing the method of setting the arrival angles of the third, fourth, . . . simulated user signals. In FIG. 6, the sector angle is 60°, the antenna spacing is 1 carrier wavelength, and number of antenna elements in a linear array is 5, where a is the desired user signal arrival direction, b and c are the first and second simulated user arrival directions, respectively, and the interfering user distribution is shown in the form of a bar graph for the respective angle ranges. In this case, d and e are set as the third, fourth simulated user signal arrival angles in order starting from the largest number of users (in order starting from the highest incidence excluding the range from b to c).

Figure 3:
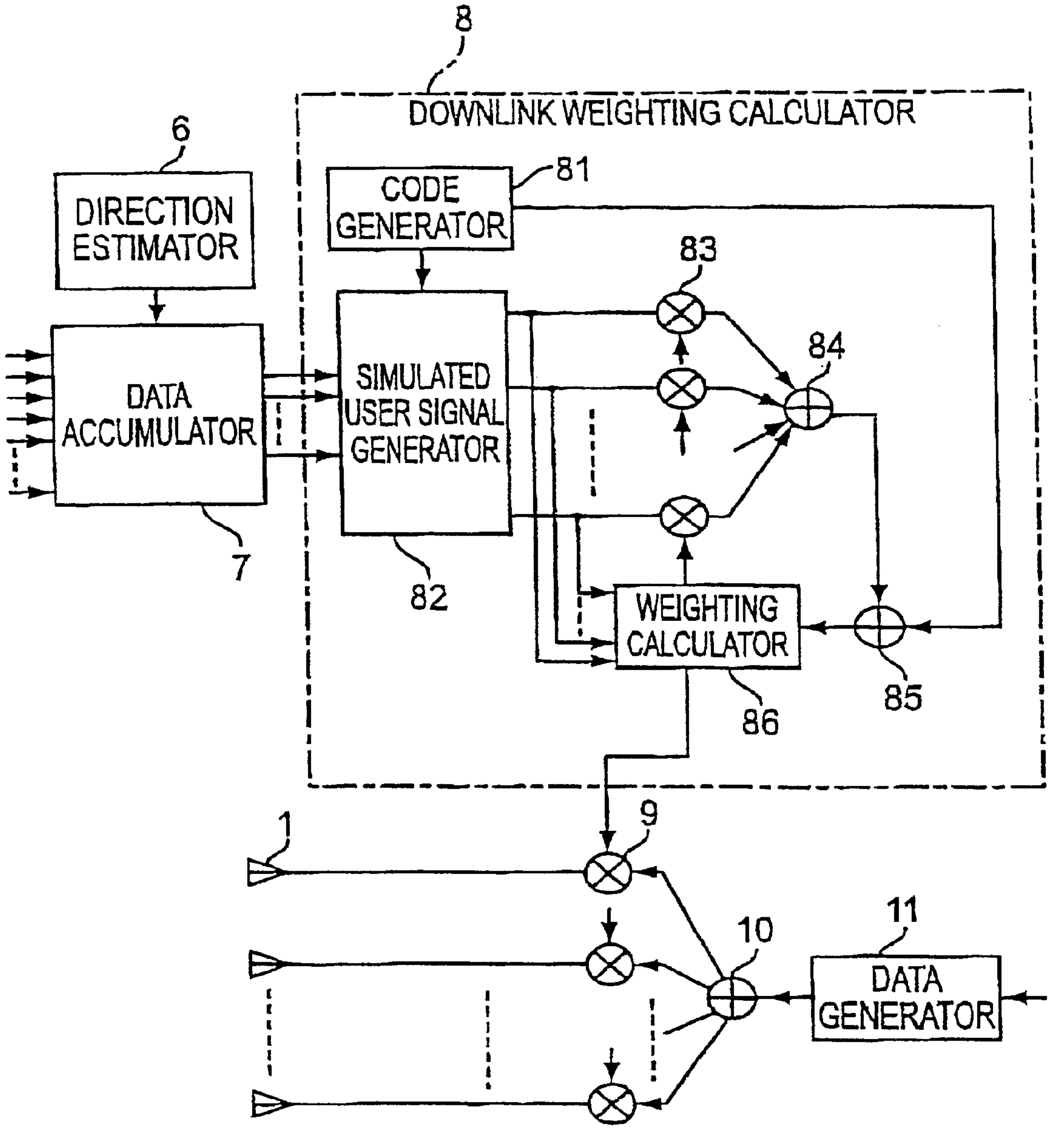
FIG. 3 diagrammatically shows the detailed structure of the downlink weighting calculator of the embodiment of the present invention.

FIG. 3 shows the transmitting system with the detailed structure of the downlink weighting calculator 8 as the downlink AAA functional block. In the FIG. 6, the components identical to those shows in FIG. 1 are given the same symbols. In FIG. 3, a code generator 81 generates the required number of uncorrelated or poorly-correlated signals (e.g., orthogonal codes), a simulated user signal generator 82 generates simulated user signals from the arrival angle information from the user direction data accumulator 7 and the signals from the code generator 81, and combines and provides output of simulated user signals for each antenna branch. Multipliers 83 multiply the weights for each antenna branch calculated by a weighting calculator 86 by the simulated user signals of the simulated user signal generator 82 and provide an output thereof. A combiner 84 combines the outputs of the multipliers 83 and provides this as an output.

On the other hand, the weighting calculator 86 accepts the input of the simulated user signal multiplexed signals for each antenna branch from the simulated user signal generator 82, and also, among the signals generated by the code generator 81, the signal suited to the desired user direction is provided as an input to an adder 85 as the reference signal, and the difference with the output of the combiner 84 is provided as an input to the weighting calculator 86.

Figure 4:
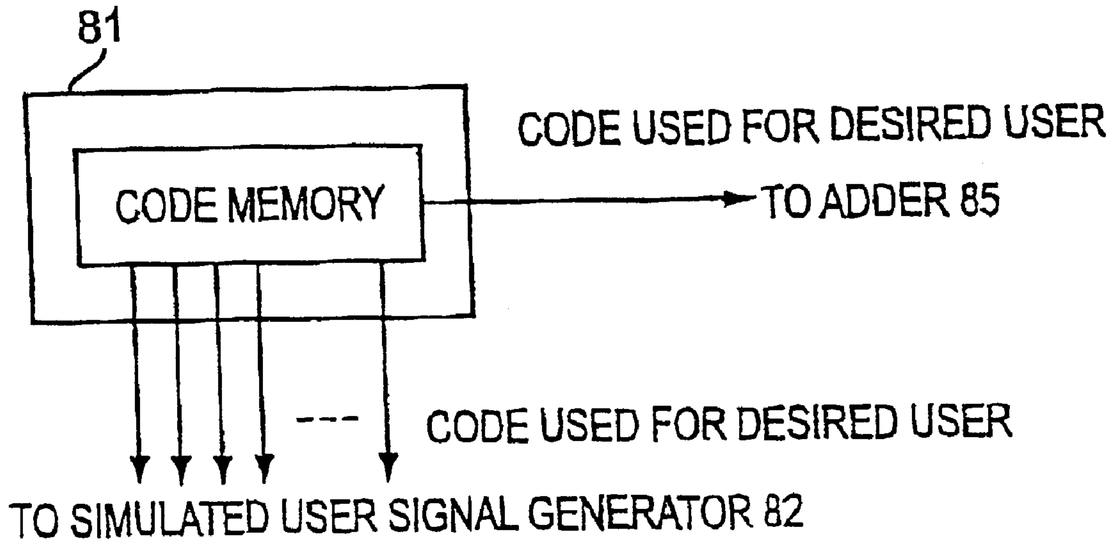
FIG. 4 diagrammatically shows detailed structure of the code generator in the downlink weighting calculator of FIG. 3.

FIG. 4 shows in detail the structure of the code generator 81. Since the adaptation process typically does not function well unless the cross correlation among the user signals used is poor, the setting of an uncorrelated or poorly-correlated signal as the user signal is prerequisite. In the case of the scheme of the present invention, since this user signal can be set as an ideal signal with no deterioration at all, it is possible to use an orthogonal code which is guaranteed to be uncorrelated. FIG. 4 shows the details of the code generator 81 which generates such a code exclusively for downlink use. Internally there is a code memory containing a number of orthogonal codes in excess of the number of antennas N, and codes are read out from this code memory and passed to the simulated user signal generator 82. Each orthogonal code has the same period and these are used repeatedly. The uncorrelated or poorly-correlated signals $C_m(t)$ generated by the code generator 81 are given below.

$$C_m(t)=a_m(t)+jb_m(t) \tag{2}$$

m=desired (m+0) and simulated user number

Among these, the code used for the simulated signal of the desired user to provided as input to the adder 85 as the reference signal.

Figure 5:
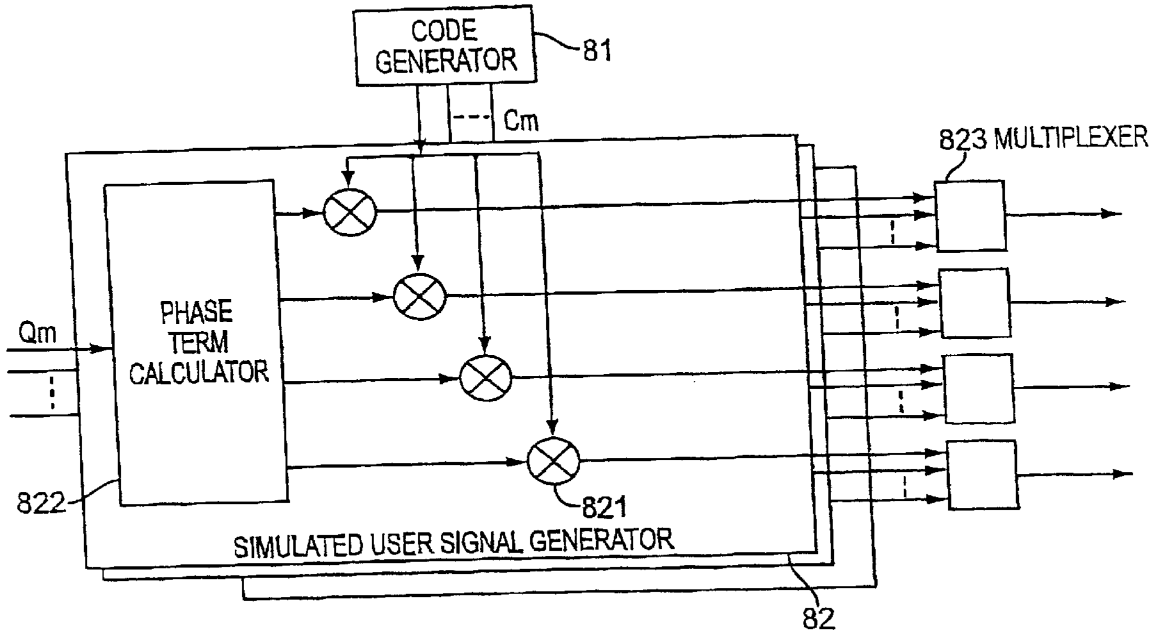
FIG. 5 shows the detailed structure of the simulated user signal generator in the downlink weighting calculator of FIG. 3.

FIG. 5 shows the details of the structure of the simulated user signal generator 82. Here the desired and simulated user signals are generated as described below. First, an uncorrelated or poorly-correlated signal $_m(t)$ such as in equation (2) above is equipartitioned and provided as input to a multiplier 821.

Next, the arrival angle information of the desired or simulated user is provided as an input to a phase term calculator 822, and phase terms corresponding to each antenna branch are determined as follows.

$$A_{mn}=[t,\exp(jkd\ \sin\theta_m),\ \exp(jk2d\ \sin\theta_m),\ \ldots,\ \exp(jknd\ sin\ \theta_m),\ \ldots,\ \exp\ (jk(N-1)d\ \sin\ \theta_m)] \tag{3}$$

$k=2\pi/\lambda_d$ (where $\lambda_d$ is the wavelength of the downlink frequency)

d: distance between elements $\theta_m$: arrival angle of $m^{th}$ user signal n: 0 to N=1, number of the antenna branch N: number of antenna From this, the simulated user signal corresponding to each antenna branch is generated in the multiplier 821 as $$X_{mn}(t)=C_m(t).\ A_{mn} \tag{4}$$

and then the signal of each branch is generated in the multiplexer 823, becoming as follows.

$$X_n(t)=\Sigma x_{mn}(t) \tag{5}$$

(where Σ symbolizes the sum from m=1 to M.)

M: total number of simulated user signals including desired user signal

Moreover, in the weighting calculator 86 shown in FIG. 3, if the LMS (Least Mean Square) adaptive algorithm is applied, for example, the adaptive weight $W_{0n}$ for each antenna branch for the desired user in calculated successively as follows.

$$W_{0n}(t+\Delta f)=W_{0n}(t)+\mu X_n^+(t)e(f) \tag{6}$$

$$Y_0(t)=\Sigma W_{0n}(t)\ X_n(f)$$

(where Σ symbolizes the sum from $n$=0 to N=1.)

$r_0(t)=C_0(t)$ $e(t)=r_0(t)-Y_0(t)$ $\mu$: step size

It should be noted that the initial value of the adaptive algorithm is to be the weight at which the in-phase condition results in the arrival direction of the desired user.

However, in the present invention, the adaptive algorithm applied has no particular limitations, as any scheme may be used as long as it is an algorithm wherein the simulated user signals generated by the present invention can be used. In addition, while the portion relates to one user is presented here, in fact, a similar processing is performed for each user.

Figure 7A:
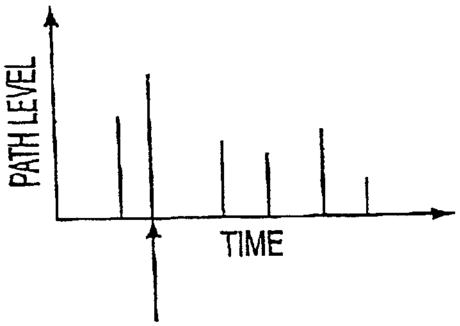
FIGS. 7A and 7B are graphs for explaining the operation with respect to multi-paths in the embodiment of the present invention.
Figure 7B:
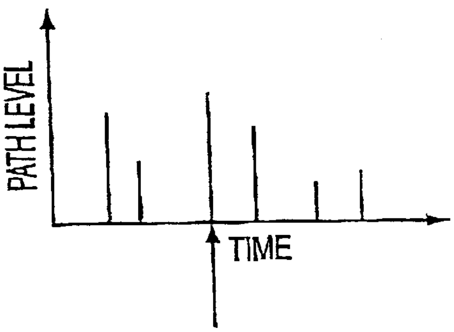

FIGS. 7A and 7B show the typical multi-path time characteristic in the mobile communications environment related to the present invention, or the so-called delay profile. For example, in the case of a propagation environment such as in FIG. 7A, in the present invention the arrival angle information extracted from the user signal at the path indicated by the arrow (the signal wherein the path level is greatest) is used for simulated user signal generation. In addition, when the multi-path level has changed as shown in FIG. 7B, the arrival angle information similarly extracted from the user signal of the path indicated by the arrow (the signal wherein the path level is greatest after the change) is used. In this manner, paths with a high receive level are also reliable in arrival angle estimation, so performing downlink beam forming in this direction is appropriate. Moreover, in the event that the access scheme is CDMA, path separation can be performed easily and this scheme is effective.

Figure 8:
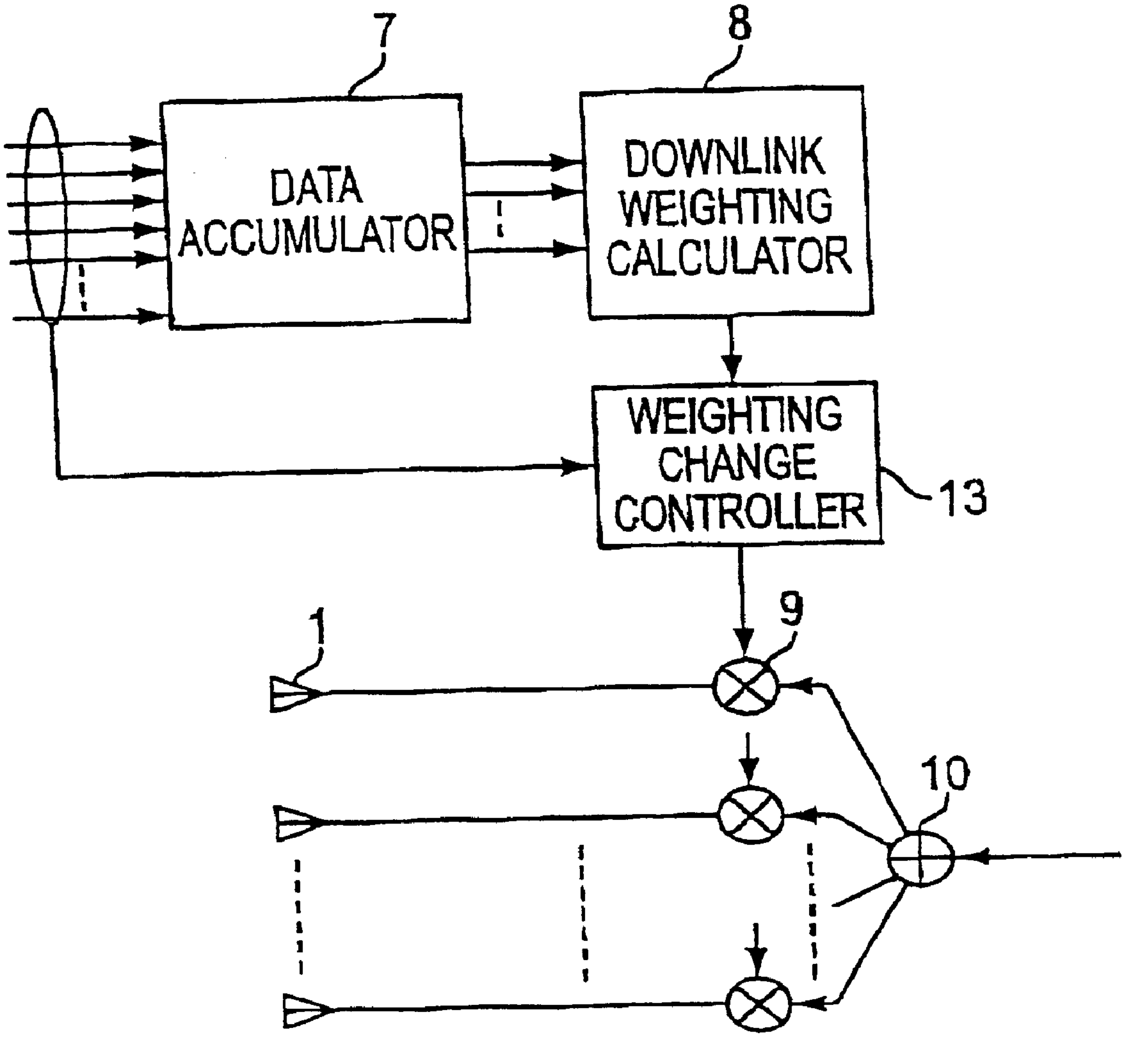
FIG. 8 is a block diagram showing another embodiment of the present invention.

FIG. 8 diagrammatically shows a second of the present invention. The communications device of FIG. 8 includes a downlink weighting change controller 13. In FIG. 8, the components described above are indicated with the same symbols. The weighting change controller 13 accepts from the user direction data accumulator 7 an input of ungrouped arrival angle information for all users, and uses this in the functional blocks for each user at arbitrary time intervals to set the level of the desired user direction to "S", the level of the other interfering user directions to "I" and the sum thereof to "$I_n$" and thus calculates the $SH_n$ ratio (namely the SIR). Then, control is exerted such that if its value is improved from the previous value, then the weights are updated to the weights now calculated by the downlink weighting calculator 8 and passed to the weighting multipliers 9, but if it is not improved, then the previous weights are kept. In this case, in order to keep the algorithm from stopping, the weights used in the weighting update formula are calculated with the sequentially calculated weights regardless of whether or not the weights actually used are updated. Then, this comparison is performed at arbitrary time intervals and the weights actually used are either updated or kept.

Figure 9:
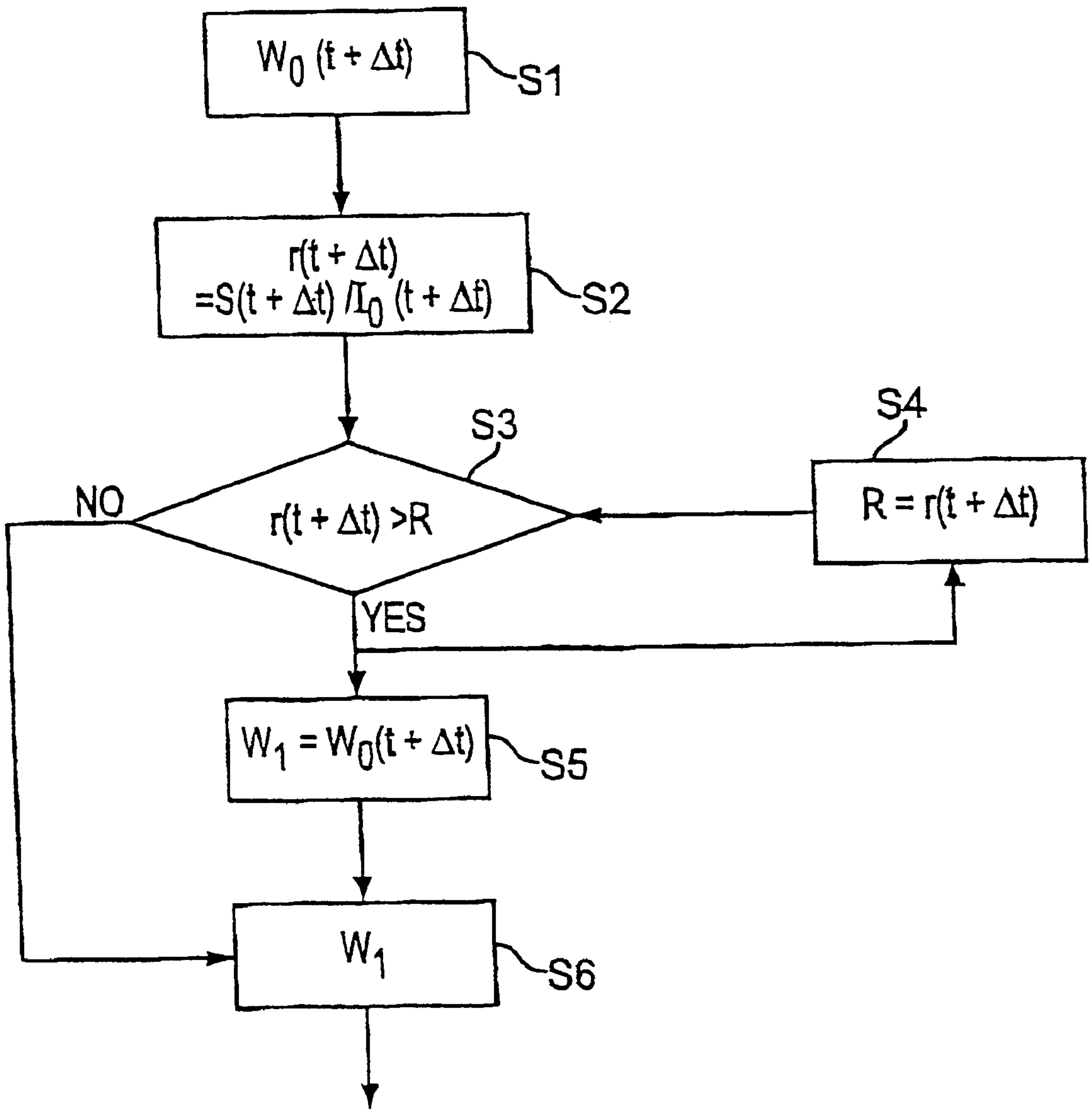
FIG. 9 is a flowchart that shows the control procedure in the weighting change controller in the embodiment of FIG. 8.

FIG. 9 is a flowchart that shows the control procedure in the weighting change controller 13. At arbitrary time intervals ($\Delta t \leqq t_0$, where $t_0$ is the weighting update time), the updated weight $W_0(t+\Delta f)$ is input (Step S1), and that weighting $W_0(t+\Delta f)$ is used to calculate the beam pattern level in each user level including the desired user. Then $S/I_n$ is calculated by $$r(t+\Delta t)=S(t+\Delta t)/I_n(t+\Delta t)$$

Step S2). This value r(t+ t) and the previous value R are compared (Step S3), and if the new weighting is larger, the weight passed to the weighting multipliers 9 is updated to this value as $W_1=W_0(t+\Delta t)$ and at the same time (Step S5), this value is kept as the previous value R (Step S4). But if smaller, the weight is not updated and the previous values are kept and used (Step S6).

When the weights applied to each antenna branch are sequentially updated in this manner, a function is provided for calculating the level of the desired-direction user and the level in each interfering user direction at arbitrary time intervals from information on the beam pattern formed from various user functional blocks and information on the desired-user direction and the interfering user directions, and comparing these levels against the previous levels, so that if the characteristics would be improved by changing to new weights then the change to the new weights is made, but if the converse is true and the characteristics were better in the previous state then those weights are kept, and the adaptive algorithm calculates the next weightings based on the new weights regardless of this selection.

Figure 10:
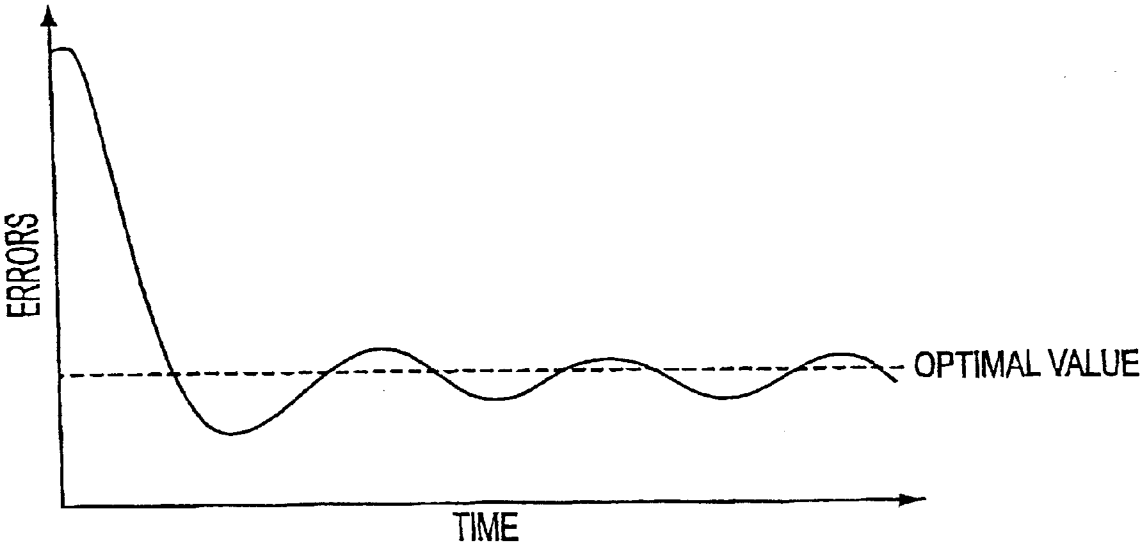
FIG. 10 is a graph for explaining the state of convergence based on the control of the weighting change controller in the embodiment of FIG. 8.

As shown in FIG. 10, the adaptive algorithm will not necessarily updated optimal values in the process of convergence, and the error function will fluctuate around the optimal value. The purpose of the second invention is to minimize the fluctuation with the control according to the weighting change controller 13.

Figure 11:
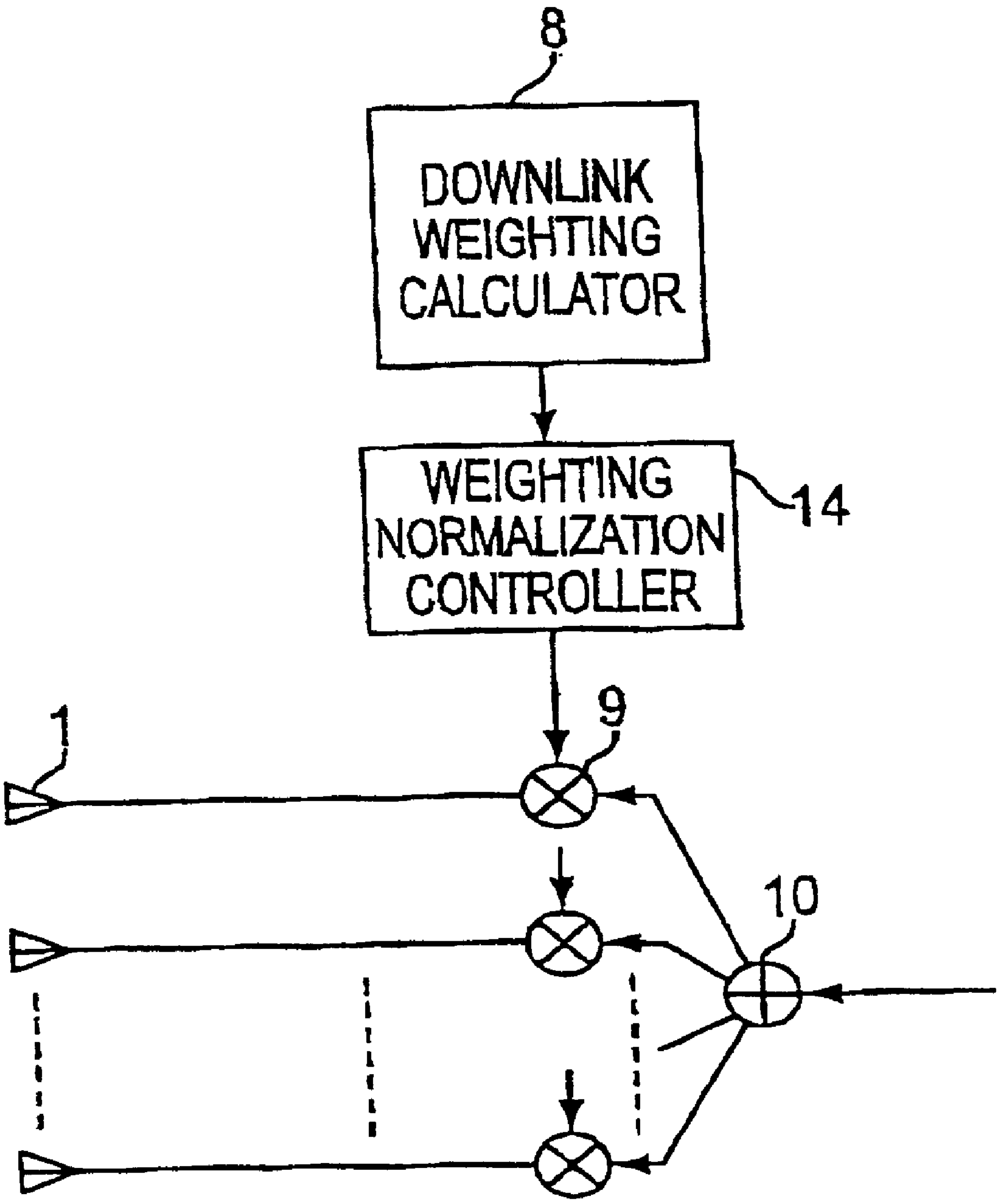
FIG. 11 is a block diagram showing still another embodiment of the present invention.
Figure 12:
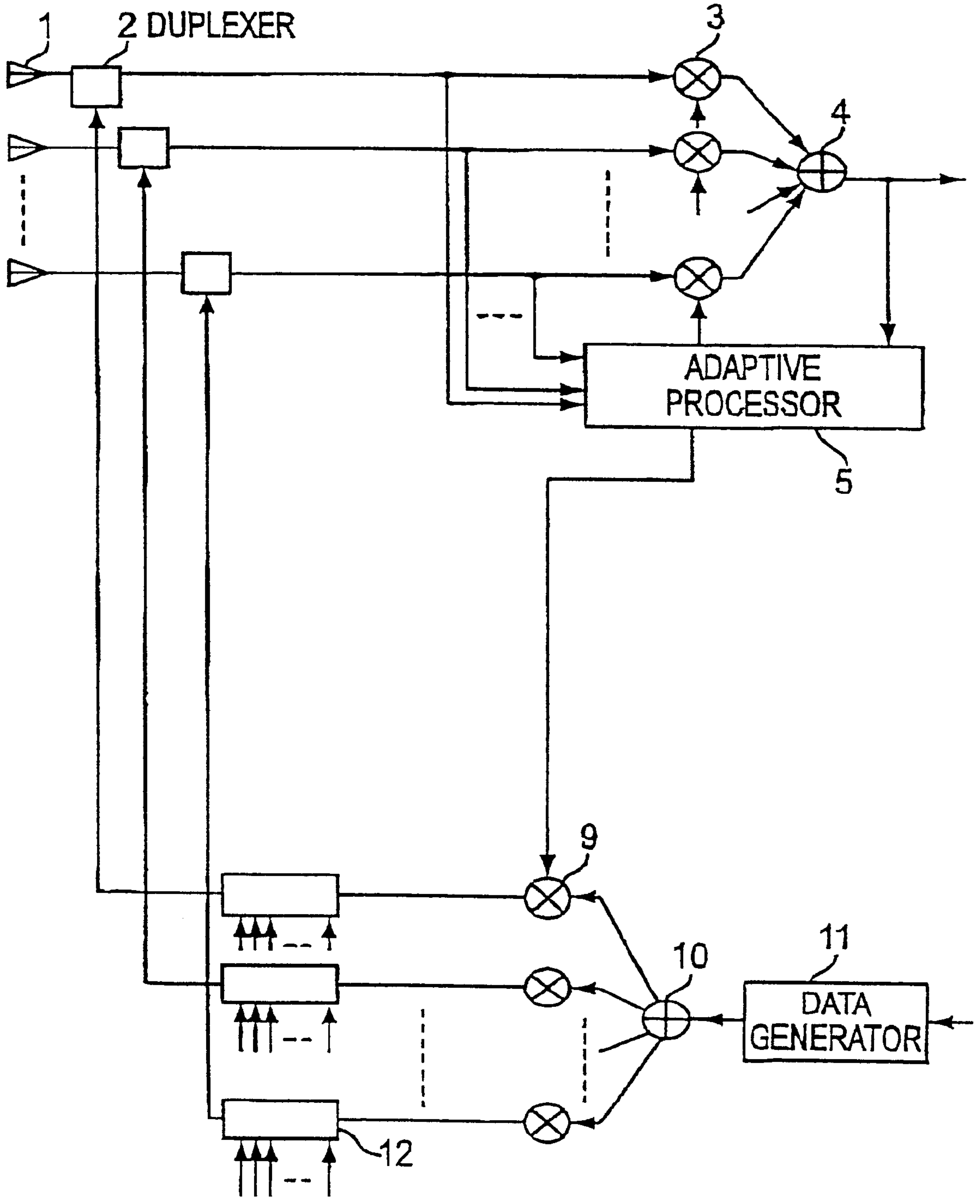
FIG. 12 (PRIOR ART)
FIG. 12 is a block diagram showing a communications device of the prior art.

FIG. 11 is a diagram of yet another embodiment of the present invention, showing the downlink beam homing functional block including a weighting normalization controller 14 coupled to the down-link weighting calculator 8. In the weighting normalization controller 14, as shown in equation (7) below, after calculating $a_m$ by performing an operation using the absolute value of the weight of each antenna branch (typically plural), with respect to the output weights of the downlink. weighting calculator 8 as shown in equation (8) below, the original weight is multiplied by that value to find a new weight which is passed to the weighting multiplies 9.

$$\alpha_m=(N)^{1/2}/\Sigma|W_{mn}| \tag{7}$$

(where Σ symbolizes the sum from n=0 to (N−1).)

$$W_{mn}'=\alpha_m\bullet W_{mn} \tag{8}$$

Therefore, in the event that there is a limitation on the transmitter power of the wireless base station, by performing normalization control of the transmitter power of each individual user, adaptive processing control is performed while keeping the transmitter power of the entire wireless base station to below the limit.

In this manner, at the time of calculating the weights of the downlink, the weights applicable to the antenna branches are subjected to normalization control, and by maintaining the transmitter power per user at an arbitrary value, the total transmitter power of the communications device can be maintained at an arbitrary value.

As described above, according to the present invention, by using the same arrival angle information for the uplink and downlink from uplink user signals, and by further using signals uncorrelated or poorly-correlated to each user to generate simulated user signals and thus performing downlink between adaptation control, adaptive control of the weights provided as input to the various antenna elements in the downlink is possible from the uplink arrival angle information regardless of the magnitude of the difference in frequency between the uplink and downlink in a FDD system or the like.

In addition, the maximum gain is maintained by pointing the peak of the main beam in the desired user direction and also, even in the case n which interfering users in excess of the degrees of freedom of the antenna are present, control of the weights of each antenna branch can be exerted such that the receiver SIR of each user of the downlink is optimized.

Thus, by applying the present invention to a wireless base station or other communications device, its contribution to increasing the system capacity is large.

What is claimed is:

1. A communications device using an adaptive antenna comprising an array antenna including a plurality of antenna elements wherein beam shaping is performed by adaptively giving arbitrary weights to the signals input to the respective antenna elements; means for extracting arrival angle information for each user from unlink user signal information; means for generating simulated user signals corresponding to each antenna branch based on the arrival angle of a desired user; and means for controlling eights of the downlink applied to respective antenna branches, based on an arbitrary adaptation algorithm using said simulated user signals.

2. The communications device using an adaptive antenna of claim 1, wherein means controlling weightings extracts arrival angle information for each user from uplink user signal information, sets the arrival angle of a desired user and simulated first and second arrival angles that bracket the arrival angle of said desired user, setting N-3 or more simulated arrival directions (N: number of antenna elements, N>3) in addition to the arrival angles, and generates simulated user signals corresponding to each antenna branch using the arrival direction information, phase information determined from the antenna arrangement, etc., and one of uncorrelated or poorly-correlated signals, respectively, and users the simulated user signals in an arbitrary adaptive algorithm to control the weights applied to the respective antenna branches.

3. The communications device using an adaptive antenna of claim 2, wherein mutually orthogonal codes are used for the uncorrelated or poorly-correlated signals used in the generation of simulated user signals by said generating means.

4. The communications device using an adaptive antenna of claim 1, and further comprise means for collecting in each cell or each sector, arrival angle information for each user and a memory provided so that various user information is aggregated within an arbitrary angle range and updated at arbitrary time intervals.

5. The communications device using an adaptive antenna of claim 4, wherein simulated first and second arrival directions that bracket the arrival angle of the desired user are set to a direction that is closest to a main beam among null directions at the time of pointing the beam such that the gain in the desired user direction is maximum.

6. The communications device using an adaptive antenna of claim 5, wherein that representative values from each angle range selected based on the arrival angles of each user and the first and second arrival angles aggregated in each cell or each sector are used to set third, fourth, . . . simulated arrival angles.

7. The communications device using an adaptive antenna of claim 1, and further comprising, for changing the weights sequentially applied to each antenna branch, means provided for calculating the level of the desired-direction user and the level in each interfering user direction at arbitrary time intervals from information on a beam pattern formed from various suer functional blocks and information on the desired-user direction and the interfering user directions, and means for comparing said levels with previous levels, so that if the characteristics would be improved by changing to new weights then a change to the new weights is made, but if the characteristics were better in the previous state then the weights in the previous state are kept, and the adaptative algorithm calculates the next weightings based on the new weights regardless of selection.

8. The communications device using an adaptive antenna of claim 7, wherein at the time of calculating the weights of the downlink by said calculating means, the weights applicable to the antenna branches are subjected to normalization control, and wherein transmitter power per user at an arbitrary value is maintained to maintain the total transmitter power of the communications device at an arbitrary value.

9. The communications device using an adaptive antenna of claim 1, wherein one arrival direction used at the time of formation of the downlink beam is determined from the valid multi-path arrival angle information of the uplink, and control is exerted by said controlling means such that the beam is directed only in that direction.

* * * * *